(12) United States Patent
Sorlier et al.

(10) Patent No.: US 10,641,324 B2
(45) Date of Patent: May 5, 2020

(54) SENSOR BEARING ASSEMBLY

(71) Applicant: SKF Aerospace France S.A.S, Montigny-le-Bretonneux (FR)

(72) Inventors: Bruno Sorlier, Valence (FR); Guillaume Lenon, Lyons (FR); Guillaume Martin, Villeurbanne (FR)

(73) Assignee: SKF Aerospace France S.A.S., Montigny-le-Bretonneux (FR)

( * ) Notice: Subject to any disclaimer, the term of this patent is extended or adjusted under 35 U.S.C. 154(b) by 0 days.

(21) Appl. No.: 15/995,704

(22) Filed: Jun. 1, 2018

(65) Prior Publication Data
US 2018/0348019 A1 Dec. 6, 2018

(30) Foreign Application Priority Data

Jun. 2, 2017 (FR) .................................. 17 54928

(51) Int. Cl.
| | | |
|---|---|---|
| *F16C 19/52* | (2006.01) | |
| *G01P 3/44* | (2006.01) | |
| *G01D 11/02* | (2006.01) | |
| *F16C 41/00* | (2006.01) | |
| *F16C 33/58* | (2006.01) | |
| *G01P 1/02* | (2006.01) | |

(52) U.S. Cl.
CPC ............ *F16C 19/52* (2013.01); *F16C 33/586* (2013.01); *F16C 41/007* (2013.01); *G01D 11/02* (2013.01); *G01P 1/026* (2013.01); *G01P 3/443* (2013.01); *F16C 2233/00* (2013.01)

(58) Field of Classification Search
CPC ............ F16C 19/52–527; F16C 33/586; F16C 41/007; F16C 2230/00; G01P 3/443; G01D 11/02

USPC ......................................................... 384/448
See application file for complete search history.

(56) References Cited

U.S. PATENT DOCUMENTS

| | | | | |
|---|---|---|---|---|
| 7,205,760 | B2 * | 4/2007 | Swanson | B60B 35/121 324/174 |
| 7,287,908 | B2 * | 10/2007 | Niebling | F16C 33/7886 384/448 |
| 7,432,821 | B1 | 10/2008 | Mastro | |
| 9,546,690 | B2 * | 1/2017 | Herdier | F16C 19/522 |
| 10,113,585 | B2 | 10/2018 | Van Genuchten | |
| 2013/0188897 | A1 | 7/2013 | Reedman | |
| 2014/0130618 | A1 | 5/2014 | Klinglmair | |

(Continued)

FOREIGN PATENT DOCUMENTS

| | | |
|---|---|---|
| EP | 0453331 A1 | 10/1991 |
| EP | 1693677 A1 | 8/2006 |
| FR | 2671592 * | 7/1992 |

(Continued)

*Primary Examiner* — James Pilkington
(74) *Attorney, Agent, or Firm* — Garcia-Zamor Intellectual Property Law; Ruy Garcia-Zamor; Bryan Peckjian

(57) ABSTRACT

A sensor bearing assembly provides a bearing having at least one inner ring, at least one outer ring, at least one sensor installed in the bearing, at least one cable connecting the sensor to an external device, and a cable guide fixed to the bearing, into which the cable is inserted. The cable guide provides a flat part fixed to and resting on a flat housing of one of the rings of the bearing. The cable is fixed by adhesion in the cable guide, the cable guide is adhesively locked in rotation relative to the ring of the bearing to which it is fixed.

9 Claims, 14 Drawing Sheets

(56) References Cited

U.S. PATENT DOCUMENTS

2014/0185973 A1* 7/2014 Barcat ................ G01D 5/24433
　　　　　　　　　　　　　　　　　　　　384/448

FOREIGN PATENT DOCUMENTS

| FR | 2961871 B1 | 4/2013 |
| WO | 2010054888 A1 | 5/2010 |
| WO | 2012080779 A1 | 6/2012 |

* cited by examiner

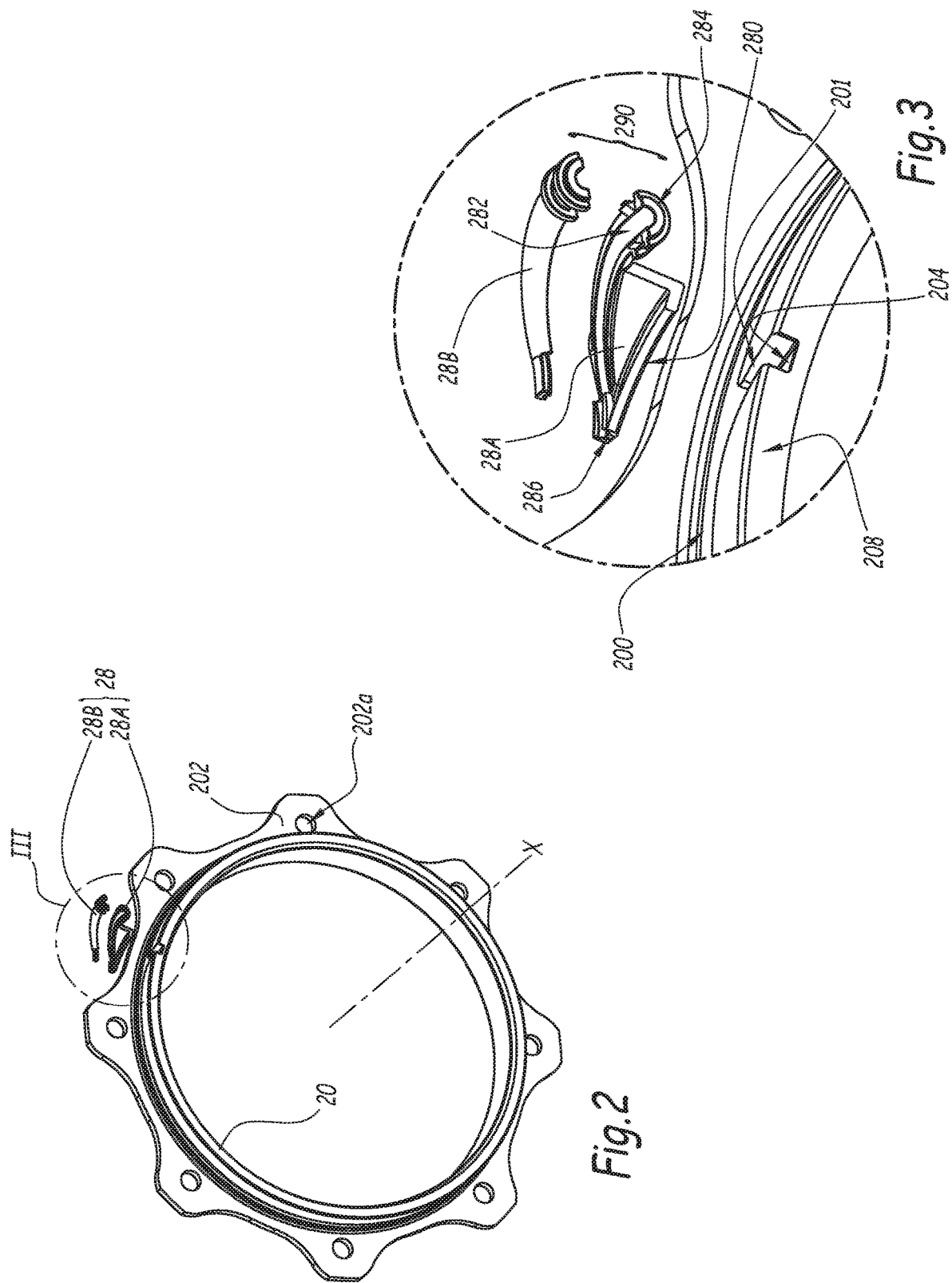

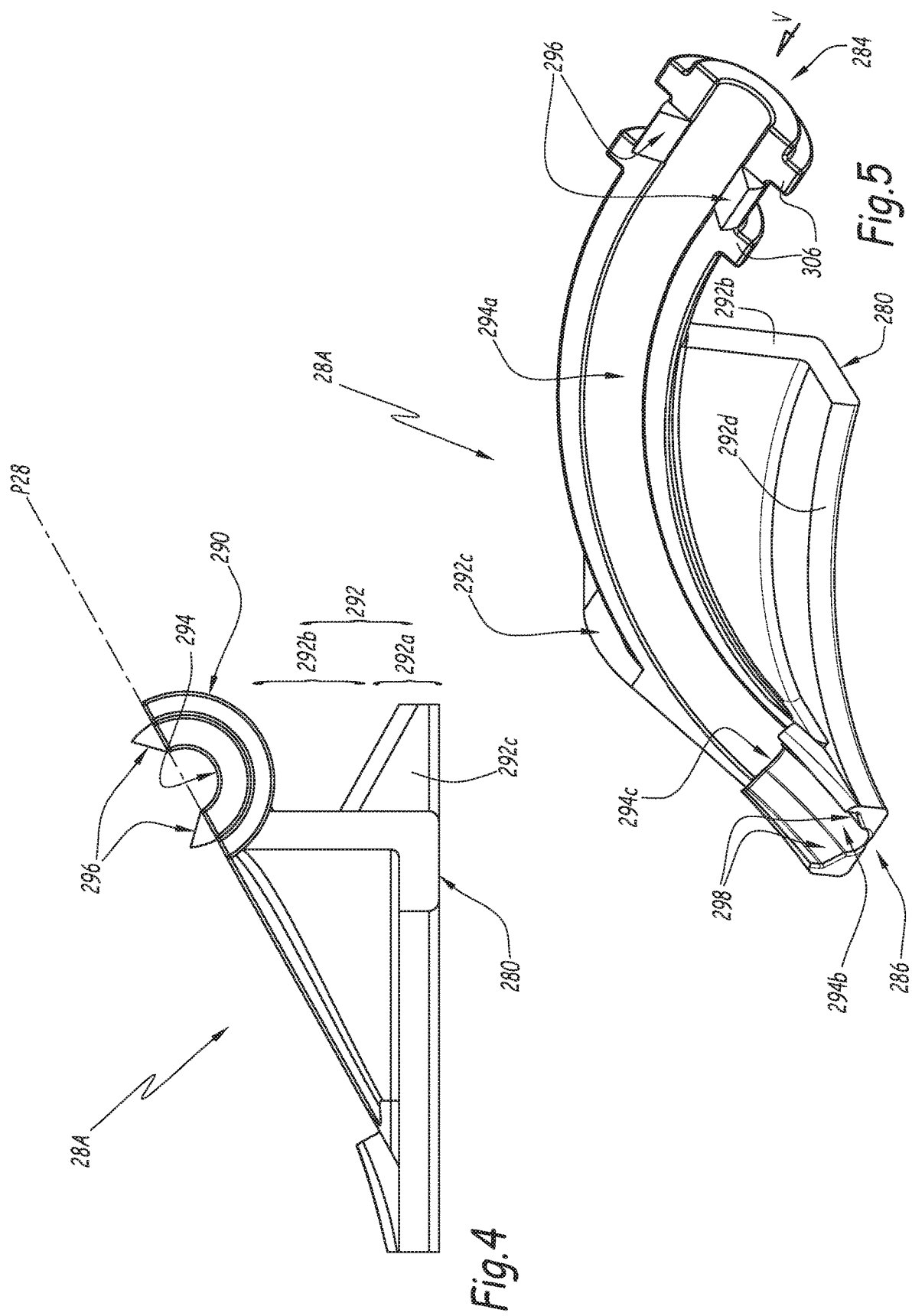

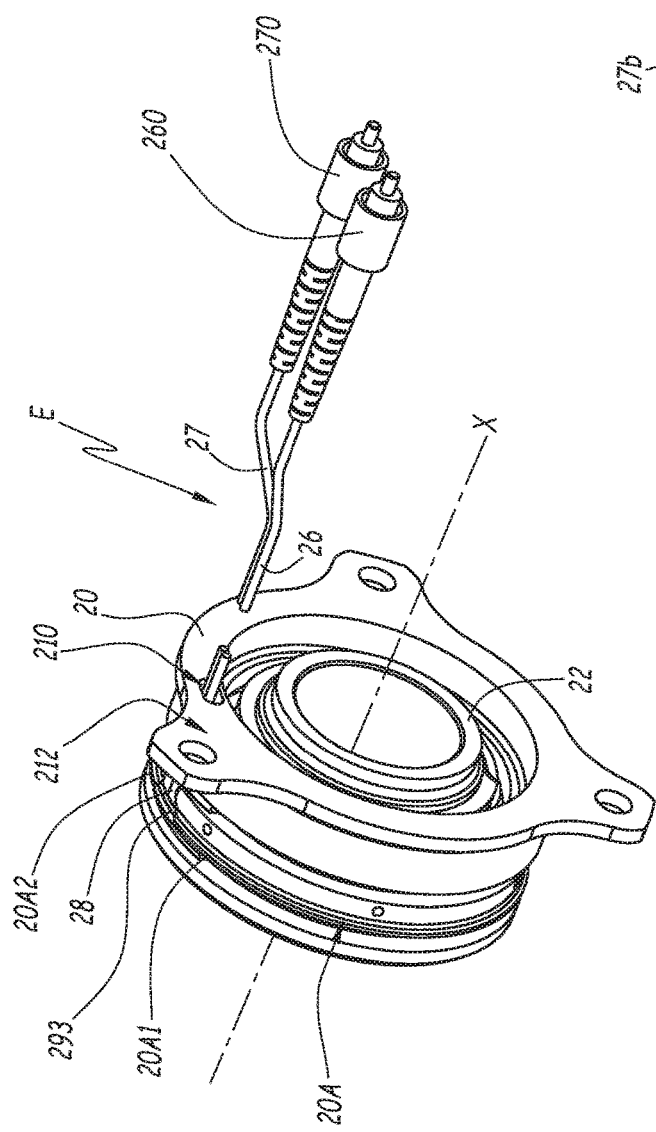
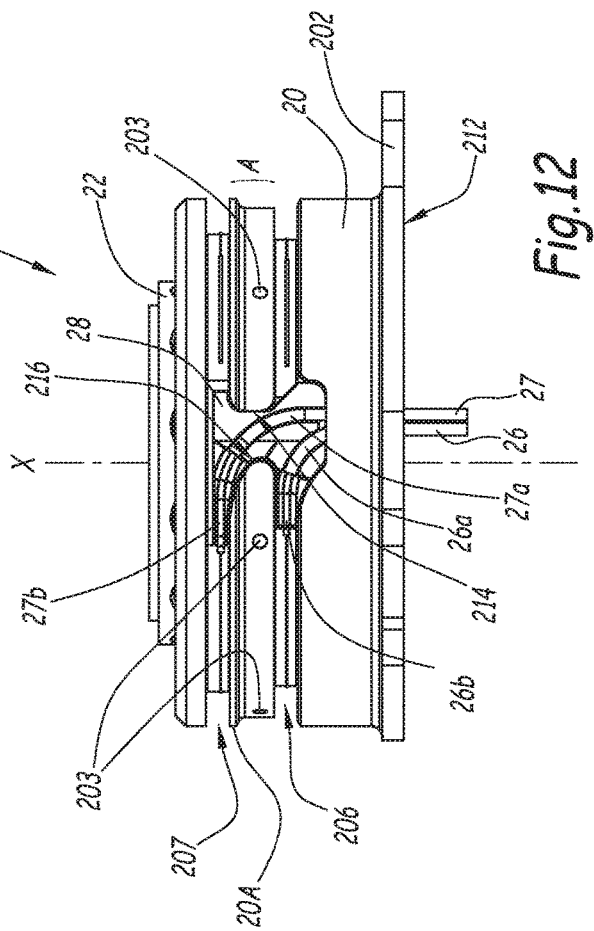
Fig.10
Fig.12

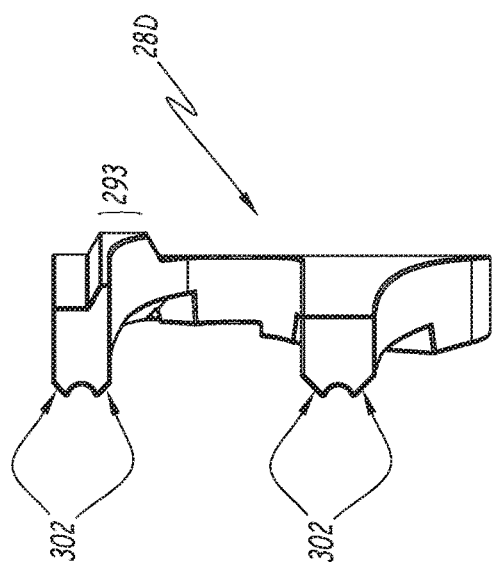
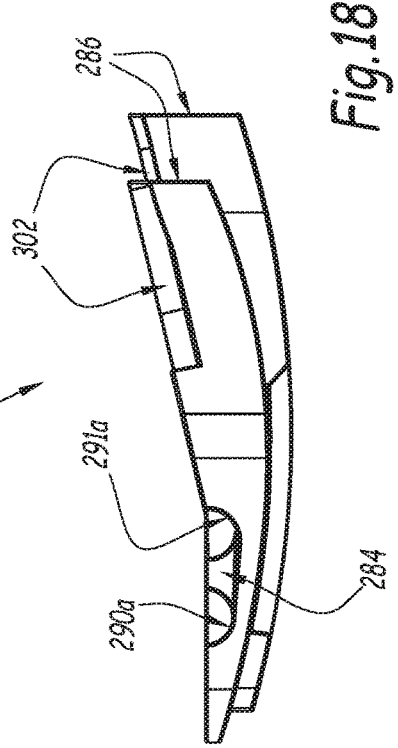
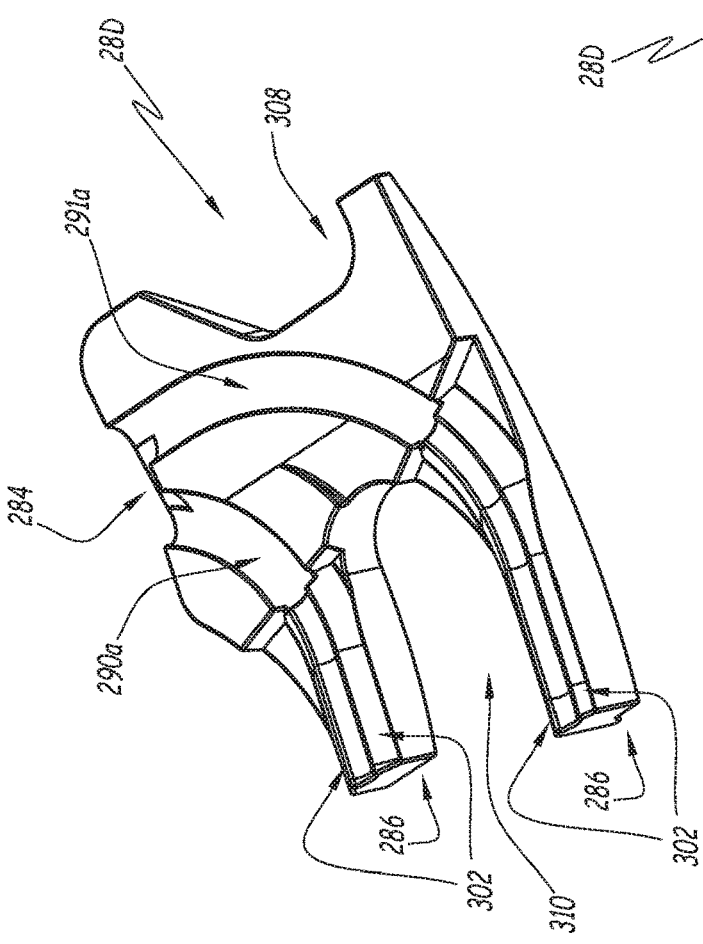

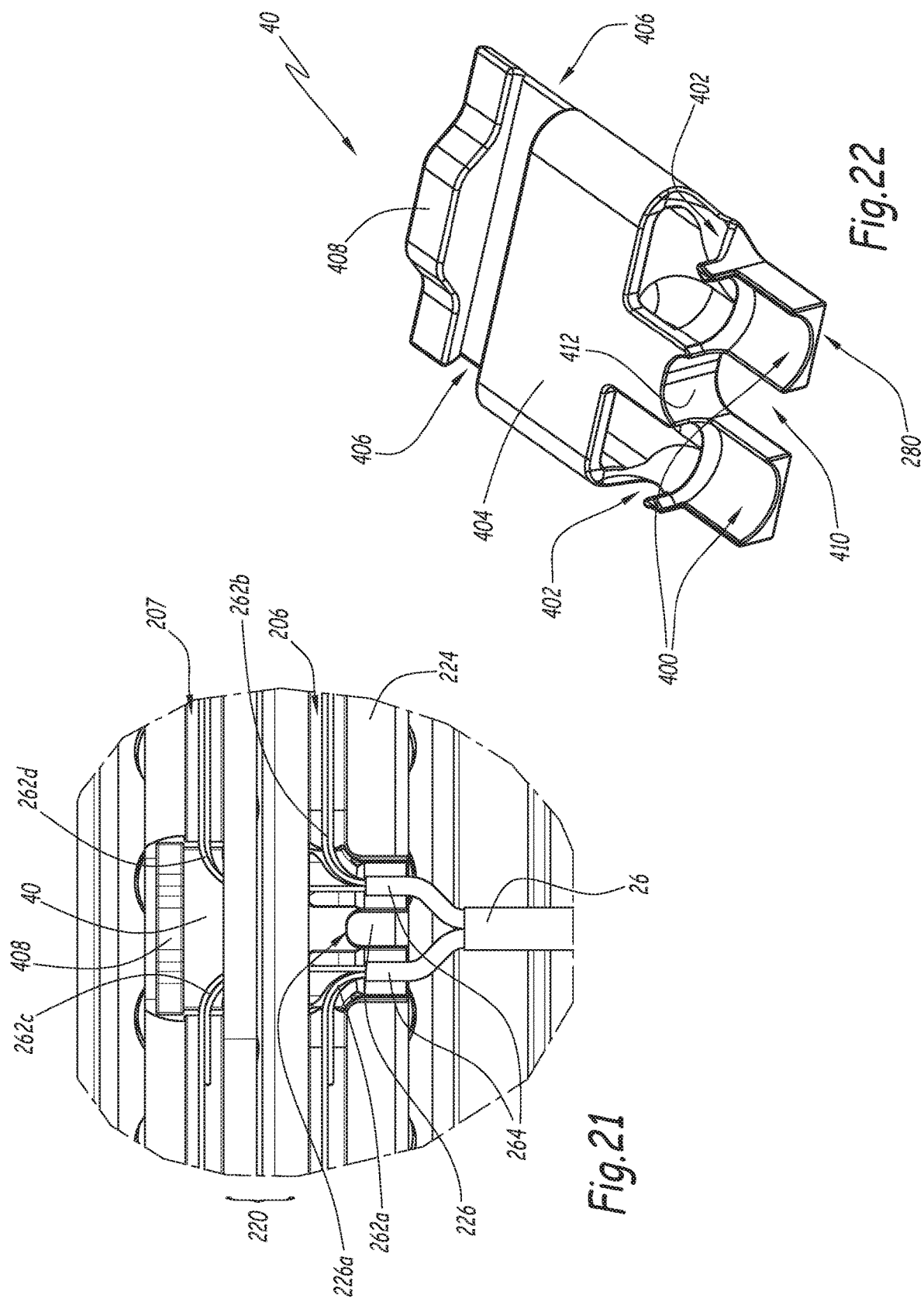

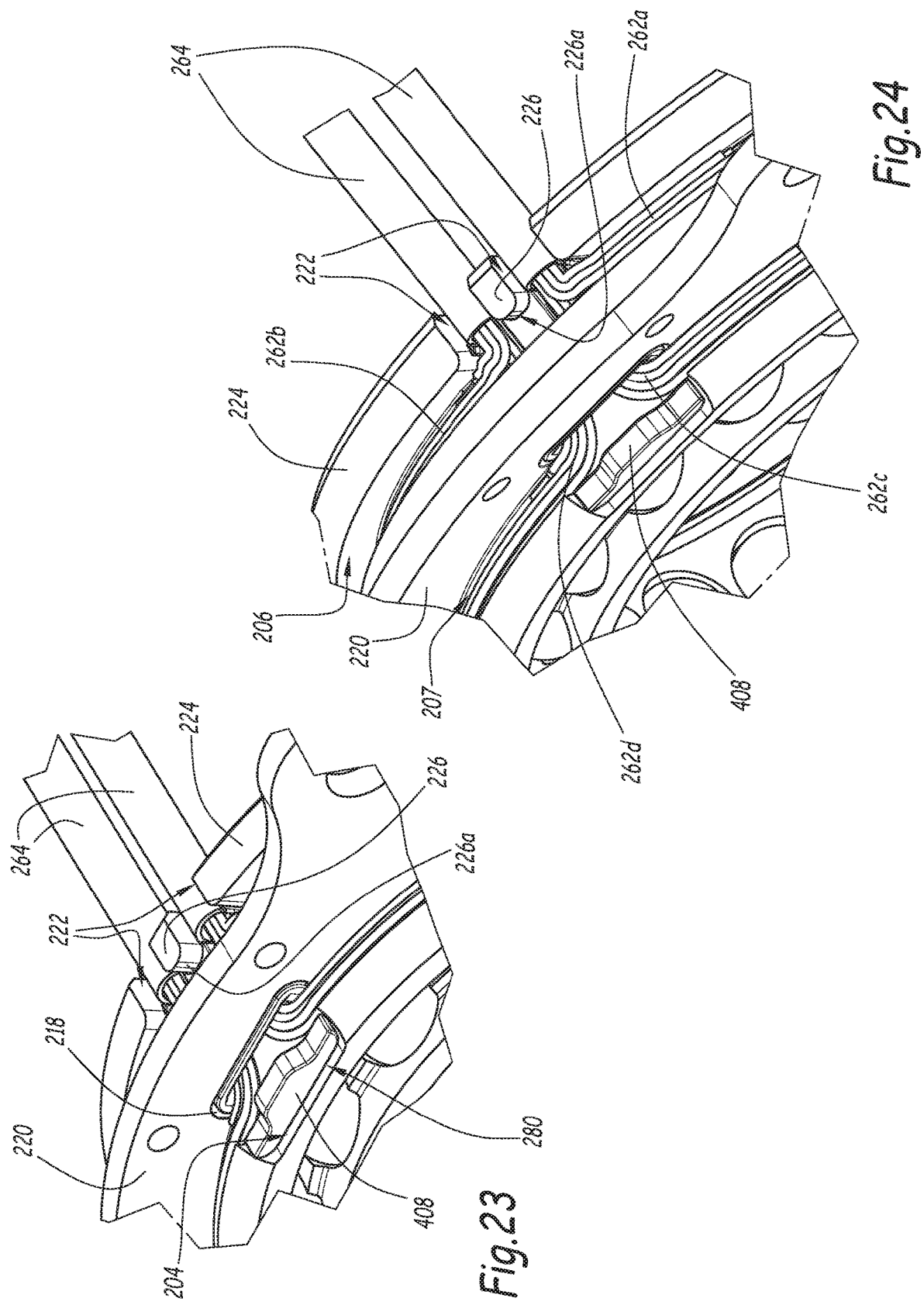

SENSOR BEARING ASSEMBLY

CROSS-REFERENCE

This application claims priority to French patent application no. 1754928 filed on Jun. 2, 2017, the contents of which are fully incorporated herein by reference.

TECHNOLOGICAL FIELD

The invention relates to a sensor bearing assembly.

BACKGROUND

Sensor bearings are usually equipped with sensors for measuring various physical quantities, such as angular position, temperature and stresses, among others. The sensors are connected by cables to a data processing device located outside the bearing. The installation of these cables, and of these electronic components more generally, must be carried out in such a way as to prevent failures throughout the whole lifetime of the equipment, including assembly, use, dismantling, handling, transport, etc. These requirements for robustness must also be met in hostile environments, notably in the presence of high temperatures or oils. Monitoring and checks conducted on sensor bearings increase the risk of failure of the sensors and connectors due to handling, transport and mechanical stresses, notably tensile stresses on the cables.

These stresses have hitherto been managed by introducing additional interfaces on mechanical components, by placing the sensors or electronic components on parts other than the bearings, by using indirect measurements of the physical quantities required, or by accepting a high risk of damage and providing for the replacement of some components.

SUMMARY

The invention is intended to overcome these problems by proposing a novel sensor bearing assembly, in which the installation of the cables and electronic components is carried out to provide greater reliability and robustness over time.

To this end, the invention relates to a sensor bearing assembly comprising:

a bearing comprising at least one inner ring and at least one outer ring;

at least one sensor installed in the bearing;

at least one cable connecting the sensor to an external device; and a cable guide fixed to the bearing, into which the cable is inserted.

This sensor bearing assembly is characterized in that the cable guide provides a flat part fixed to and resting on a flat housing of one of the rings of the bearing, and in that it provides means for locking the cable guide in rotation relative to the bearing ring to which it is fixed.

Because of the invention, the entry of the data transfer cables into the bearing is formed in a robust and precise way, thus improving the stress resistance and service life of the sensor bearing.

According to advantageous but non-essential aspects of the invention, such a sensor bearing assembly may incorporate one or more of the following characteristics, taken in any technically feasible combination:

The cable guide bends through an angle of 80° and 100°, preferably 90°, between the part of the cable entering the cable guide and the part of the cable installed in the bearing.

The cable guide has an internal geometry having differentiated areas for the parts of the cable comprising insulation and those comprising the conductor only.

The cable is fixed by adhesion in the cable guide, the cable guide is fixed by adhesion to the bearing ring, and a resin is injected on to the cable guide and the parts of the bearing ring surrounding it.

The cable guide is divided into two parts, assembled together and located on either side of the cable.

The two parts forming the cable guide provide mutual positioning elements having interacting shapes.

One of the two parts of the cable guide has a flat face adapted to be fixed to the flat housing on the bearing ring, and this part of the cable guide has funnel shapes in its internal geometry, adapted to center the cable in a location provided for receiving this cable.

The cable guide is made of metallic material, preferably by 3D metal printing.

It provides a heat-shrinkable sleeve covering part of the cable entering the cable guide and part of the cable guide, and the part of the cable guide covered by the heat-shrinkable sleeve provides radial shapes for the attachment of the heat-shrinkable sleeve.

The flat housing is provided on the outer ring of the bearing and communicates with at least one peripheral channel in which the cable is inserted and guided towards the sensor.

BRIEF DESCRIPTION OF THE DRAWINGS

The invention will be more readily understood and other advantages thereof will be more clearly apparent in the light of the following description of a sensor bearing assembly according to the principle of the invention, provided by way of non-limiting example with reference to the attached drawings, in which:

FIG. 2 is a perspective view of a variant of the sensor bearing assembly of FIG. 1;

FIG. 3 is a view on a larger scale of the detail III of FIG. 2;

FIG. 4 is a perspective view of part of a cable guide of the sensor bearing assembly of FIG. 1;

FIG. 5 is a view in the direction of the arrow V of the part of the cable guide of FIG. 4;

FIG. 10 is a perspective view of a sensor bearing assembly according to a second embodiment of the invention;

FIG. 12 is a view in the direction of the arrow XII of the sensor bearing assembly of FIG. 10, in which part of the cable guide has been omitted;

FIG. 16 is a perspective view of another complementary part of the cable guide of the sensor bearing assembly of FIG. 10;

FIGS. 17 and 18 are views of two different sides of the part of the cable guide of FIG. 16;

FIG. 21 is a view from above of the sensor bearing of FIG. 20;

FIG. 22 is a perspective view of a cable guide of the sensor bearing assembly of FIG. 20;

FIG. 23 is a perspective view of the sensor bearing assembly of FIG. 20 and of the cable guide of FIG. 22, with the angle of view reversed;

FIG. 24 is a perspective view of the sensor bearing assembly of FIG. 20 showing the cable guide of FIG. 22 and the cables mounted on the sensor bearing and in the cable guide.

DETAILED DESCRIPTION

Figure 1:
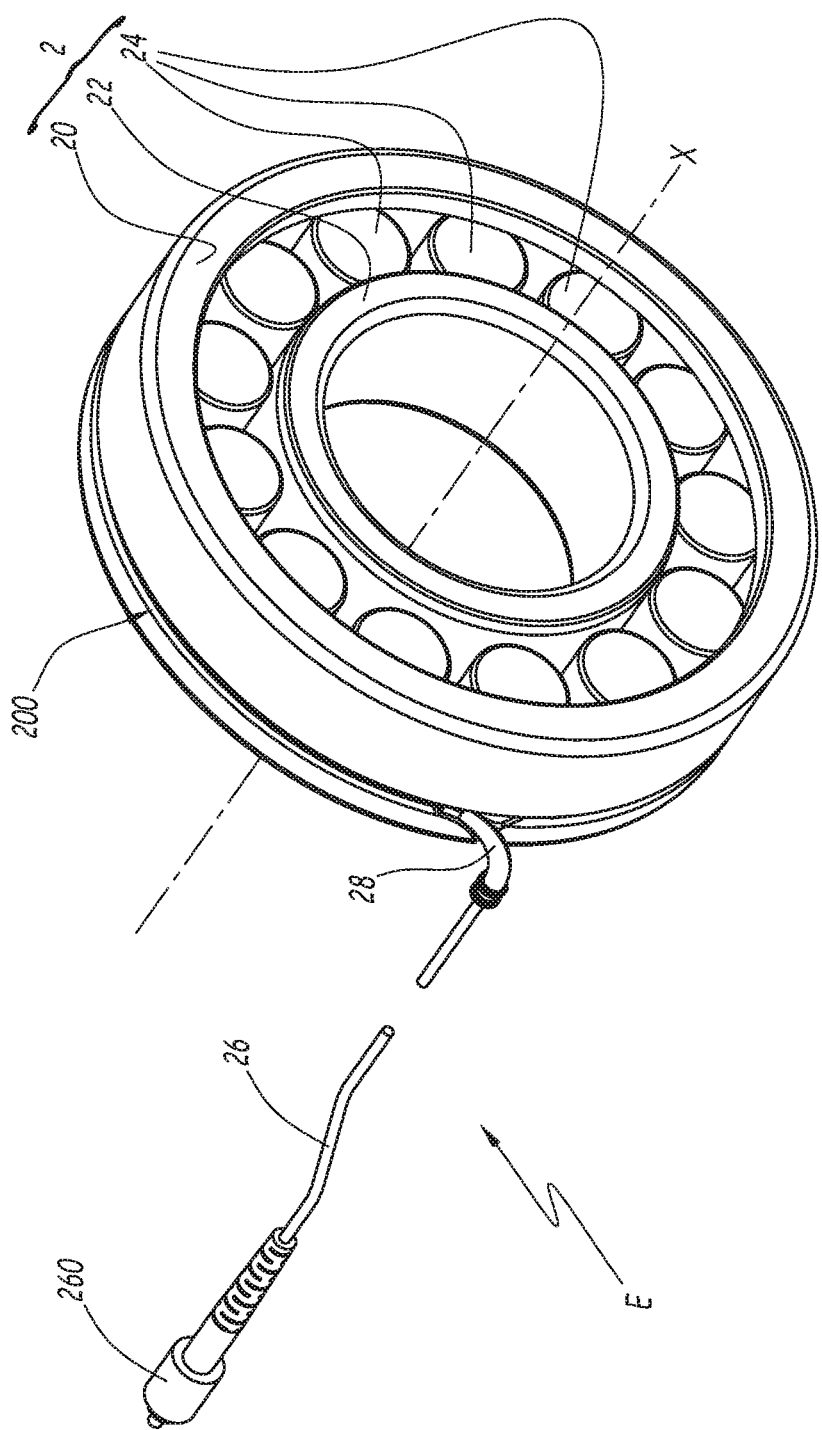
FIG. 1 is a perspective view of a sensor bearing assembly according to a first embodiment of the invention.
Figure 7:
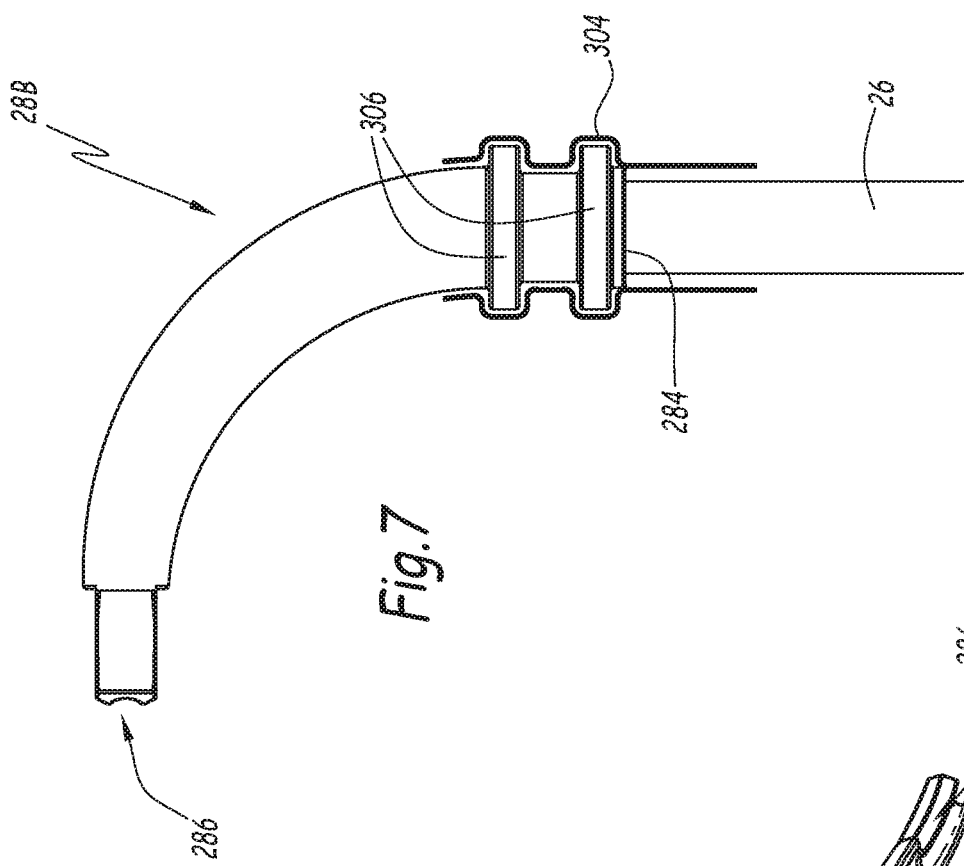
FIG. 7 is a top view of a cable guide, an optical fiber sleeve and a heat-shrinkable sleeve belonging to the sensor bearing assembly of FIG. 1.

FIG. 1 shows a sensor bearing assembly E comprising a bearing 2 including an outer ring 20, an inner ring 22 and rolling elements 24, which may be rollers, balls or needles. The invention is also applicable to bearings not comprising rolling elements, notably plain bearings.

The outer ring 20 and the inner ring 22 are movable in rotation relative to one another about an axis of rotation X which is also the central axis of the bearing 2. In the rest of the description, the adjectives "axial" and "radial", and the adverbs "radially" and "axially" are used, respectively, for directions parallel and perpendicular to the axis X. An axial surface is a surface which is perpendicular to the axis X, and a radial surface is a cylindrical surface surrounding the axis X and centered on this axis.

Figure 20:
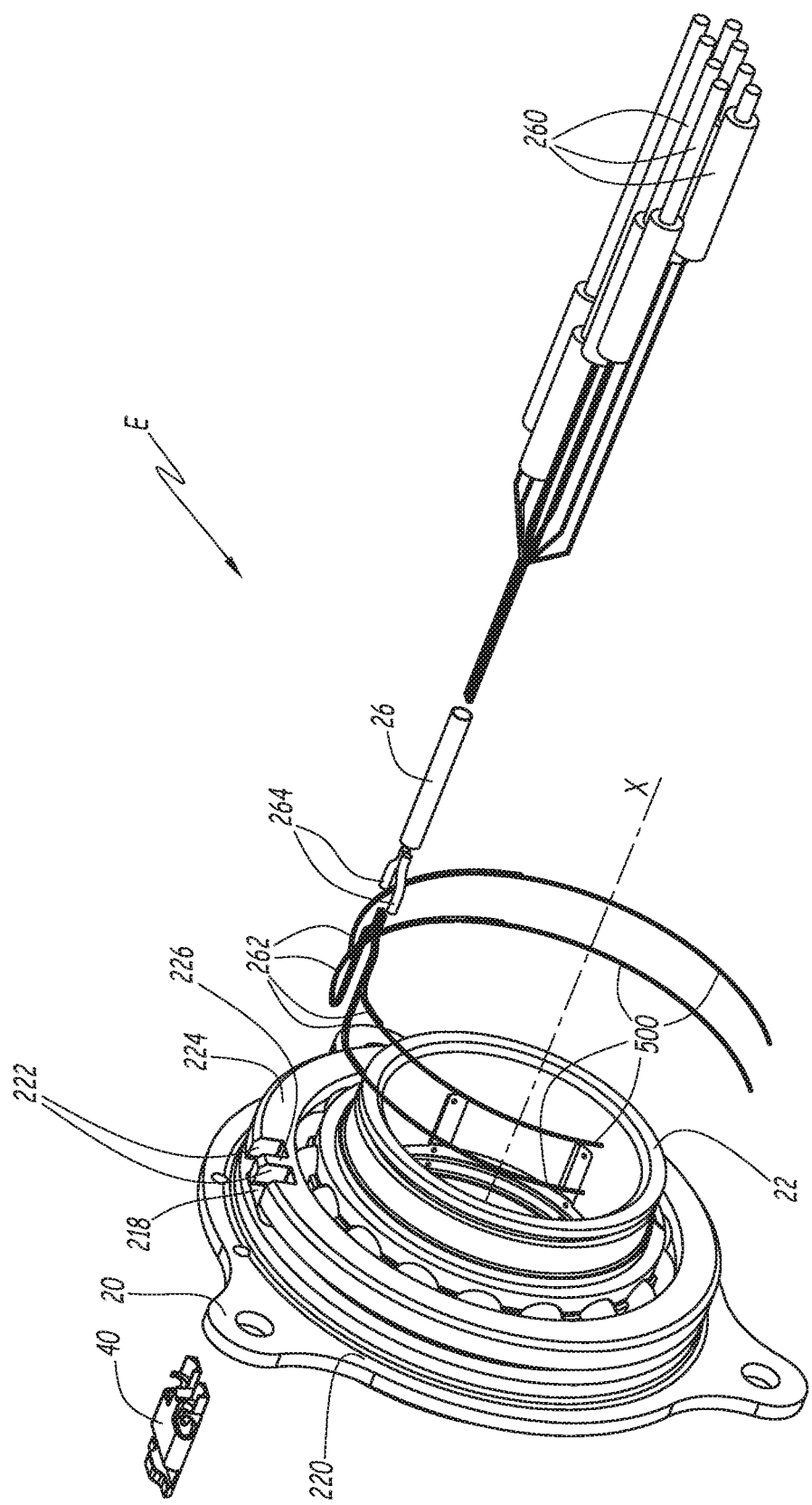
FIG. 20 is a partially exploded perspective view of a sensor bearing assembly according to a third embodiment of the invention.

The assembly E also provides one or more sensors connected to an output cable 26 terminating in a connector 260. The connector 260 is intended to be connected to an external data processing device which is not shown. The sensors may be strain gauges, sensors of deformation, vibration, or temperature, in this case thermocouples 500 shown in FIG. 20, among other types, or different types of sensor combined.

The cable 26 is introduced into the bearing 2 via a cable guide 28 which enables the cable 26 to be guided towards the sensors and makes the connection between the cable 26 and the bearing 2 robust. In the present case, the outer ring 20 provides an external groove 200 into which the cable 26 is inserted.

According to a variant shown in FIG. 2, the outer ring 20 may provide a flange 202 having holes 202a for fastening the outer ring 20 to a support which is not shown.

As shown in FIG. 3, the cable guide 28 provides a flat part 280 fixed to and resting on a flat housing 204 of the outer ring 20 to which it is fixed. The flat housing 204 is partially formed by the groove 200 and by a curved channel 201 which extends between the groove 200 and an axial edge 208 of the outer ring 20.

The cable guide 28 has a rounded shape so as to guide the cable 26 along a bend between the axial direction in which it enters the cable guide 28 and a radial direction in which it is inserted into the groove 200. The bend in the cable guide 28 causes the cable 26 to form an angle of 90°. In a variant, this angle may be, for example, between 80° and 100°. The radius of curvature of this bend is preferably greater than a threshold value specified according to the nature of the cable 26 and of its component wires, and according to the information transmitted by these wires, in order to prevent damage to the cable and to the data travelling along these wires.

In the illustrated example, the cable 26 is shown as being spaced apart radially from the outer ring 20, and the 90° bend is combined with an approach to the outer ring 20.

The cable guide 28 forms an inner conduit 282 which encloses the cable 26 and guides it from its entry 284 to its outlet 286. The inner conduit 282 is formed by a tubular body 290. The tubular body 290 is supported by a support structure 292 comprising a base 292a and a wall 292b. The base 292a has a flat shape and carries the flat part 280 on its lower part orientated towards the axis X. The base 292a has a straight branch 292c aligned with the groove 200, and a curved branch 292d housed in the curved channel 201. The wall 292b is located in the radial prolongation of the curved part 292d of the base 292a, and connects the tubular body 290 to the base 292a. The width of the wall 292b, in a radial direction, decreases from the outlet 286.

The base 292a is inserted into the flat housing 204 and, because of the curved part 292d which is surrounded on each side by protuberant parts of the outer ring 20 which form the curved channel 201, opposes any rotation of the cable guide 28 about the axis X relative to the outer ring 20.

The cable guide 28 has an internal geometry having differentiated receiving areas for the parts of the cable 26 comprising an insulating part or only a stripped conductor part (not shown). As shown in FIG. 4, the tubular body 290 provides an inner surface 294 having a wide part 294a with a diameter adapted to the diameter of the insulating part of the cable 26, and a narrow part 294b having a smaller diameter, adapted to grip the stripped part of the cable 26. These two parts are separated by a shoulder 294c.

As shown in the drawings, the cable guide 28 is preferably divided into two parts 28A and 28B. These two parts 28A and 28B are assembled together and are located on either side of the cable 26. In other words, a plane P28 of separation between parts 28A and 28B passes through a central axis of the cable 26. This two-part structure facilitates the mounting of the cable in the cable guide 28, notably by preventing any damage that might occur if the cable 26 had to be inserted for its full length through the cable guide 28.

Part 28A, called the lower part, is the part that carries the support structure 292 and is fixed to the outer ring 20. Part 28B is fixed to part 28A after the cable 26 has been positioned, as detailed below.

The two parts 28A and 28B provide mutual positioning elements having corresponding shapes. These shapes provide, notably, funnel shapes 296 provided at the entry 284 on the lower part 28A and funnel shapes 298 near the outlet 286. The funnel shapes 298 also enable the conductive part of the cable 26 to be guided towards the inner surface 294 when the cable 26 is positioned in the cable guide 28.

Figure 6:
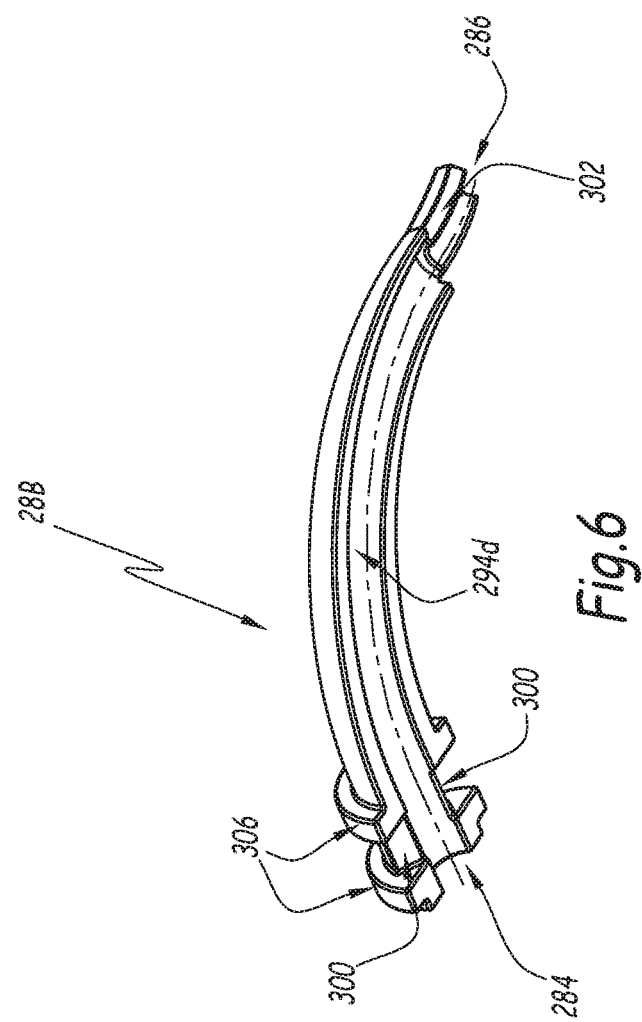
FIG. 6 is a perspective view of another complementary part of the cable guide of the sensor bearing assembly of FIG. 1.

The funnel shapes 296 and 298 interact by complementarity of shape with chamfered shapes provided on part 28B, shown in FIG. 6. These chamfered shapes provides the shapes 300 and 302 provided adjacent to the entry 284 and to the outlet 286, respectively. The funnel shapes 296, 298 and the chamfered shapes 300, 302 have flat faces bearing on one another, enabling the two parts 28A and 28B to be positioned precisely around the cable 26.

The mounting of the cable 26 and of the cable guide 28 takes place as follows. The inner surface 294 of the cable guide 28 is coated with adhesive. The cable 26 is then positioned in the lower part 28A, care being taken to align the conductive part with the narrow part 294b, while positioning the end of the insulating part against the shoulder 294c. The cable 26 is pushed to the end of the inner surface 294, allowing excess adhesive to be discharged at the edges. A part 294d of the inner surface 294, located on the upper part 28B, is coated with adhesive, and the upper part 28B is then positioned on the lower part 28A. The two parts 28A and 28B are pressed against one another and held in position while drying takes place.

A heat-shrinkable sleeve 304 may be added on the part of the cable 26 entering the guide 28 and on part of the guide 28, to reinforce the tear-out resistance and sealing of the joint between the cable 26 and the cable guide 28. To promote the attachment of this heat-shrinkable sleeve 304, the end of the cable guide 28 located at the entry 284 may be provided with a shape promoting attachment. In the illustrated example, this shape is provided in the form of two parallel peripheral ribs 306. Other attachment shapes may be provided to serve this purpose. The heat-shrinkable sleeve 34 may be threaded on to the cable 26 before it is bonded into the cable guide 28.

The flat housing 204 of the outer ring 20 is then coated with adhesive, as is the flat part 280 provided on the cable guide 28. The cable guide 28 and the flat housing 204 are then pressed against one another and held in position until drying takes place.

In FIGS. 1 to 7, the cable guide 28 allows a single cable 26 to be guided. According to a variant, shown in FIGS. 8 and 9, the cable guide 28 may be designed for the passage of two cables 26 and 27. In such a case, the cable guide 28 provides two tubular bodies 290 and 291, as shown in FIG. 9, each of these tubular bodies 290 and 291 comprising a respective inner surface 290a, 291a for receiving one of the cables 26 and 27. At the outlet 286 of the cable guide 28, the two conductive parts of the cables 26 and 27 are grouped side by side in a single flared part 290b. The tubular bodies 290 and 291 are separated at the entry 284 of the cables 26 and 27, and are then progressively brought together towards the outlet 286.

The funnel shapes 296 are identical on the tubular bodies 290 and 291 at the entry 284, and interact with chamfered shapes provided on part 28B, identical to the shapes 300. However, at the outlet 286 the guide 28 provides only two funnel shapes 298, on either side of the conductive parts 26b and 27b that have been brought together. These chamfered shapes 298 are extended by protuberances 299 which engage in recesses 300 of part 28B and ensure the mutual positioning of parts 28A and 28B.

The cable guide 28 is preferably made of metallic material, by 3D metal printing for example. Additive layer-by-layer manufacturing methods, or methods of manufacturing a component comprising a plastic binder, may be envisaged.

A second embodiment is shown in FIGS. 10 to 19. In this embodiment, elements in common with the first embodiment bear the same references and operate in the same way.

In this embodiment, the sensor bearing assembly E includes two cables 26 and 27, each equipped with a terminal connector 260 and 270. The cables 26 and 27 enter the bearing 2, not in a radially offset way relative to the outer ring 20, but directly, in the axial direction, through an oblong hole 210 in the ring which allows access to the flat housing 204. The oblong hole 210 passes through part of the axial length of the outer ring 20, from an axial surface 212. Optionally, this axial surface 212 may be extended by the flange 202.

In this embodiment, the cable guide 28 provides two inner surfaces 290a and 291a, having parts of different diameters for receiving the insulating parts 26a and 27a and the conductive parts 26b and 27b of the cables 26 and 27. The cable guide 28 is also divided into two parts 28C and 28D. Part 28C, called the lower part, carries the flat surface 280, which is housed in the flat housing 204 of the outer ring 20. The lower part 28C and upper part 28D have shoulders 294c similar to those of the first embodiment, for receiving the ends of the insulating parts 26a and 27a of the cables 26 and 27.

In a similar way to the first embodiment, the cable guide 28 has funnel shapes 298, provided on part 28C adjacent to the outlet 286 of the cables 26 and 27, adapted to interact by complementarity of shape with chamfered shapes 302 provided on part 28D. The shapes 298 also enable the conductive parts of the cables 26 and 27 to be centered at the end of the inner surfaces 290a and 291a.

Figure 8:
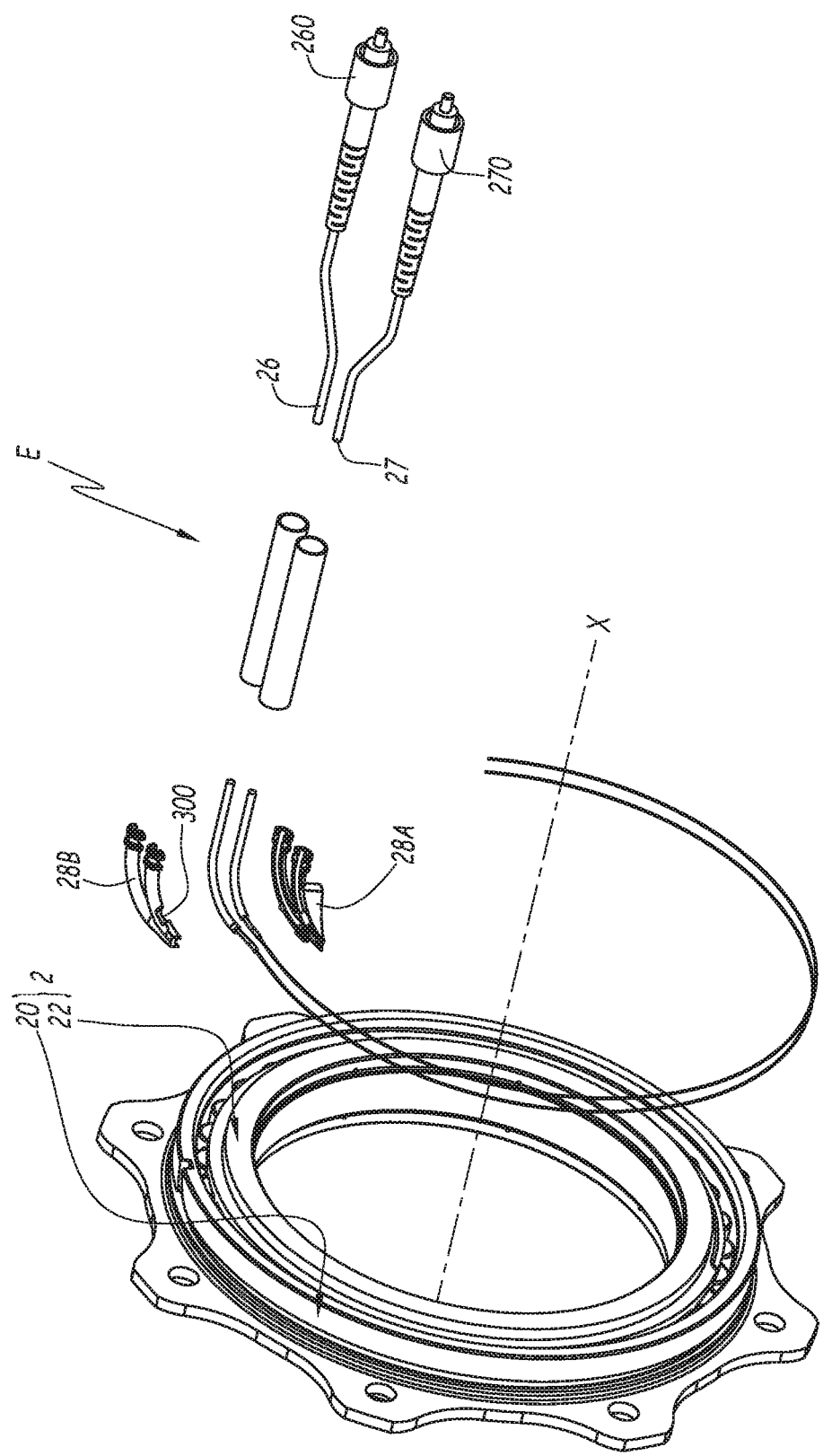
FIG. 8 is a partially exploded perspective view of a second variant of the sensor bearing assembly of FIG. 1.
Figure 9:
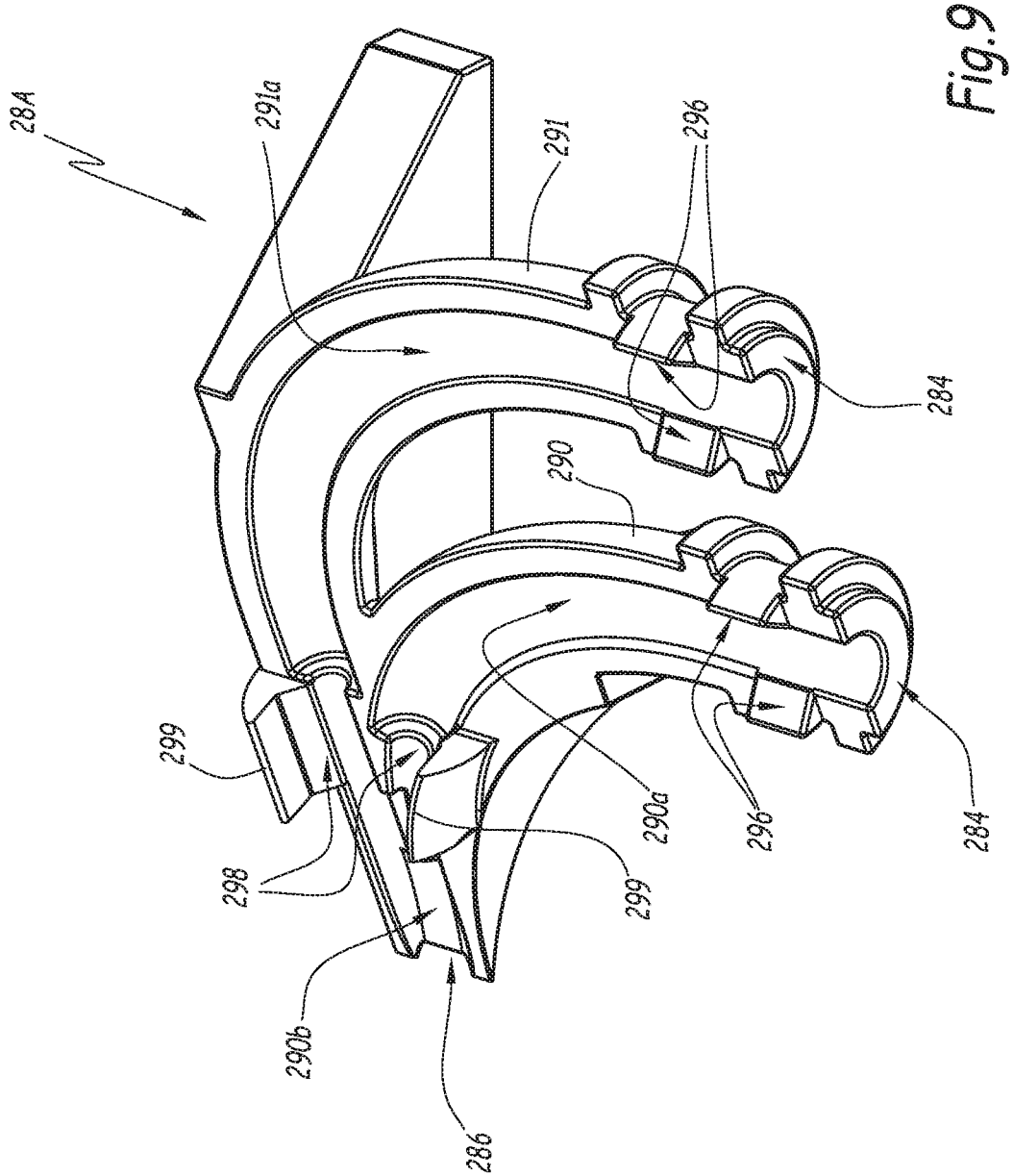
FIG. 9 is a perspective view of a part of a cable guide belonging to the sensor bearing assembly of FIG. 8.
Figure 11:
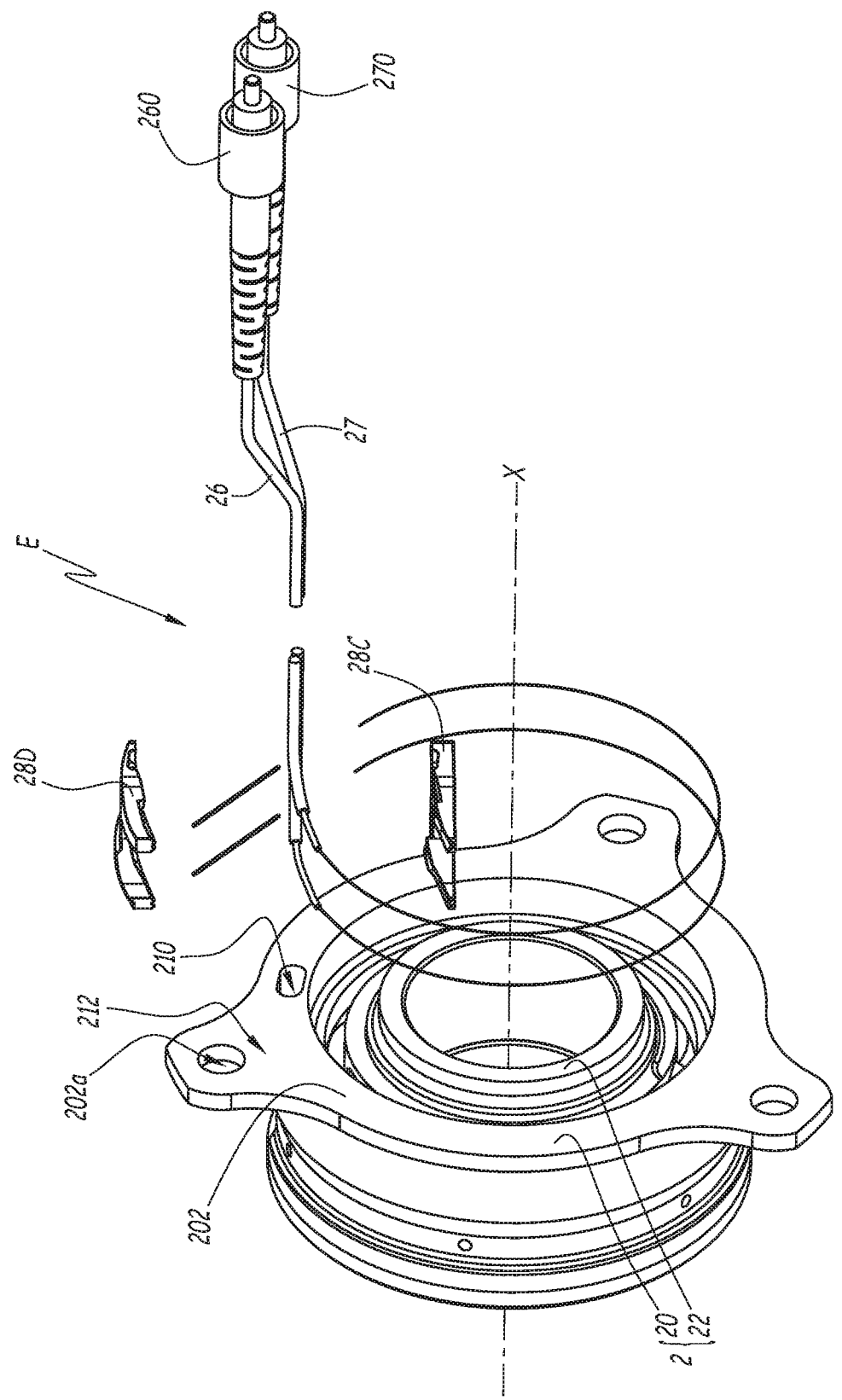
FIG. 11 is an exploded perspective view of the sensor bearing assembly of FIG. 10.
Figure 15:
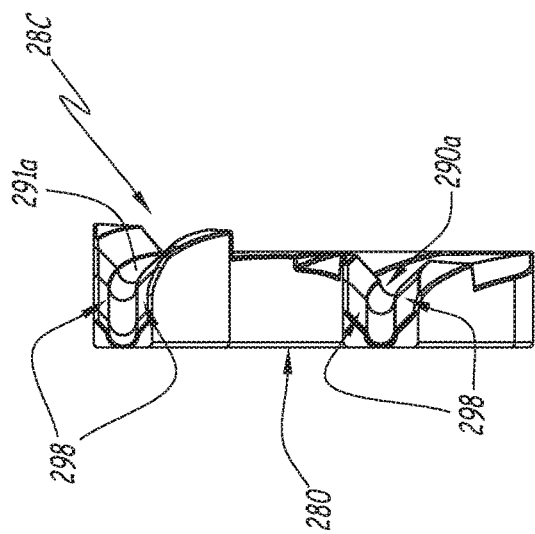
FIGS. 14 and 15 are views of two different sides of the part of the cable guide of FIG. 13.
Figure 13:
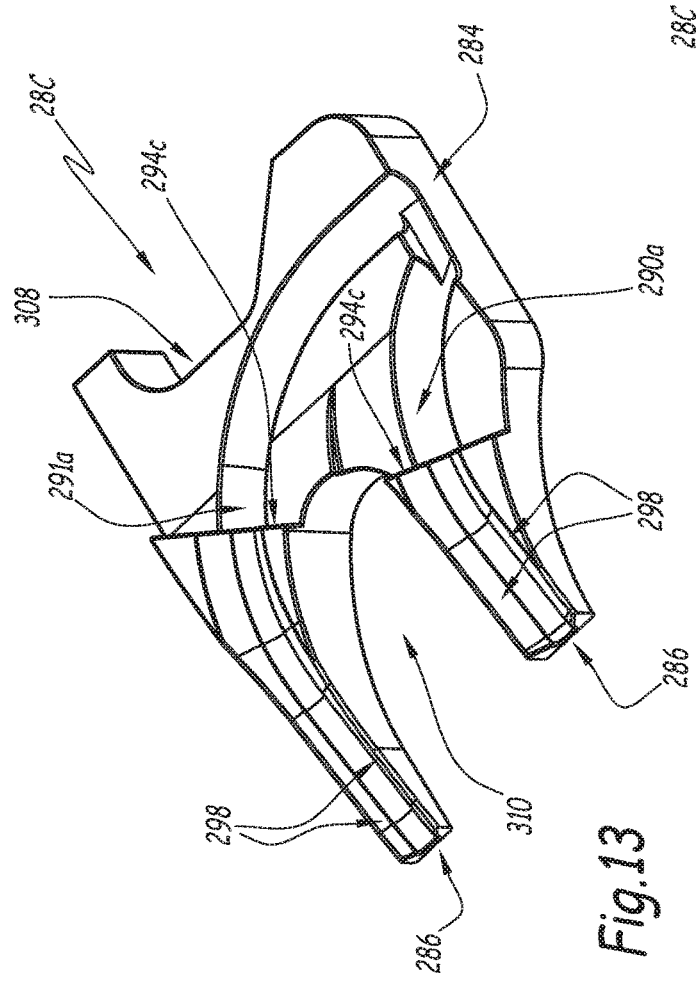
FIG. 13 is a perspective view of a part of a cable guide of the sensor bearing assembly of FIG. 10.
Figure 14:
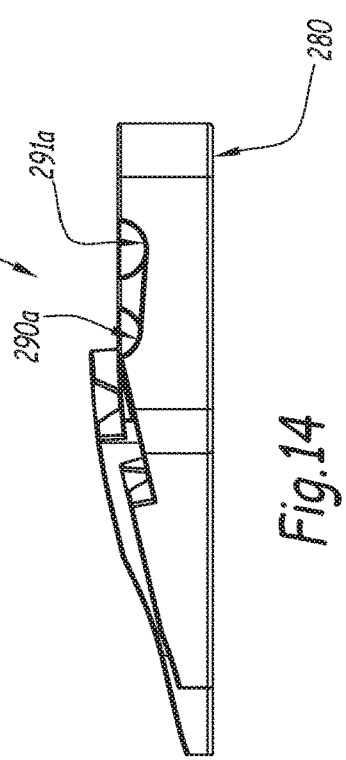
Figure 19:
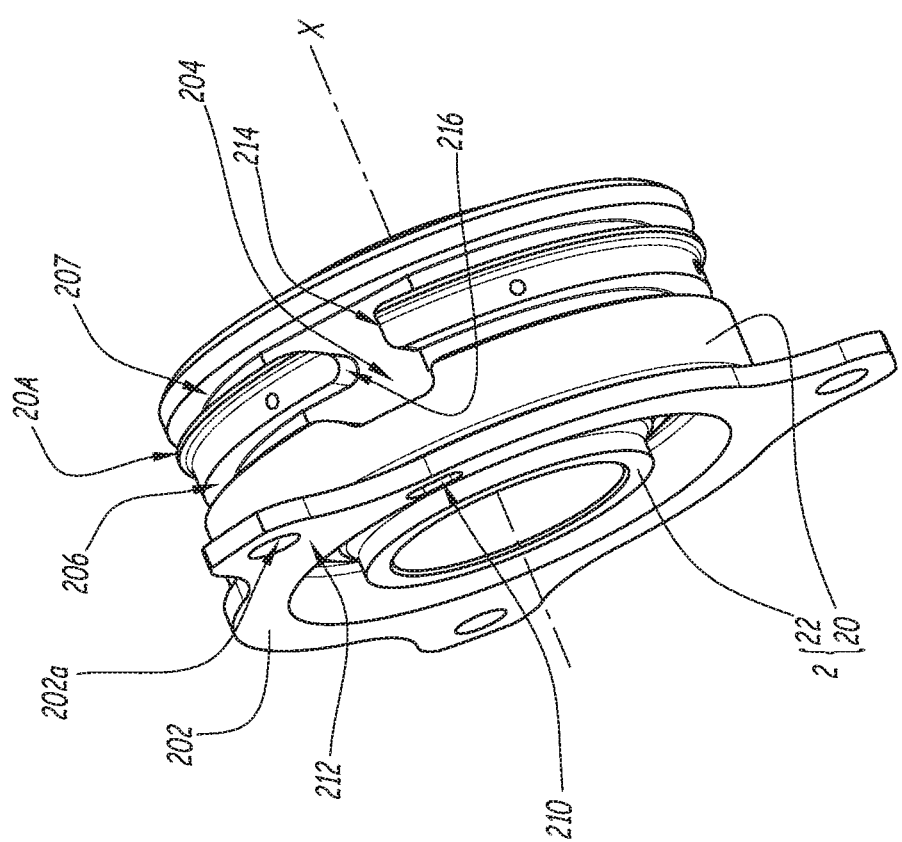
FIG. 19 is a perspective view of the sensor bearing assembly of FIG. 10 in which the cable guide and a cable are masked.

By contrast with the cable guide 28 of FIGS. 8 and 9, in FIGS. 10 to 19 the two inner surfaces 290a and 291a guide the cables 26 and 27 side by side at the entry 284, and then direct them away from one another towards two different outlets 286.

The cable guide 28 has two relief elements in the form of lateral recesses 308 and 310, opening on either side of the guide 28 in the circumferential direction. The relief element 310 is formed between the housings of the cables 26 and 27. In the mounted configuration of the two parts of the guide 28, these relief elements 310 and 308 are opposed, in the circumferential direction, to two surfaces 214 and 216 of the outer ring 20, which have a complementary shape to that of the relief elements 308 and 310. The surfaces 214 and 216 interrupt a part of the ring 20 located between two peripheral channels 206 and 207 in which the cables 26 and 27 are housed at the outlet of the guide 28. The interaction of the surfaces 214 and 216 with the recessed relief elements 308 and 310 locks the guide 28 in rotation about the axis X.

When the cable guide 28 and the cables 26 and 27 are assembled, the surface 280 of the lower part 28C is coated in advance with adhesive, as is the flat housing 204. The lower part 28C is housed in the flat housing 204 and positioned by means of the positioning surfaces 214 and 216 present on the outer ring 20. The cables 26 and 27 are then placed in the lower part 28C after the preliminary application of adhesive to the lower part 28C. The upper part 28D is then placed on the lower part 28D, after the preliminary adhesive coating of the inner parts of the upper part 28D.

In this second embodiment, the bearing 2 is lubricated by the outer ring; that is to say, there is a lubrication chamber A which is integrated into the outer ring 20, and is defined by outer surfaces of the outer ring 20 and by inner surfaces of a housing (not shown) in which the bearing 2 is mounted. The outer ring 20 provides lubrication conduits 203 which open into the lubrication chamber A and guide a lubricant towards an inner surface (not shown) of the outer ring 20. It is possible that at least one of the outer channels 206 and 207, into which the cables 26 and 27 will be inserted, may be in conflict with this lubrication chamber A. To ensure/maintain the sealing of this lubrication chamber A, that is to say to limit or prevent leaks, and thus ensure the desired distribution of the lubricant towards the inside of the bearing 2, a circumferential shoulder 20A of the outer ring 20 separates the lubrication chamber A from the channel 207. A circumferential shoulder 293, visible in FIG. 17, has been added to the upper part 28D of the cable guide 28. This ensures the continuity of sealing of the lubrication chamber A between two areas 20A1 and 20A2 of the shoulder 20A, which is interrupted by the housing 204 of the cable guide 28.

A third embodiment of the invention is shown in FIGS. 20 to 24. In this embodiment, the cable guide 40 takes the form of a single component inserted axially through the outer ring 20. The housing of the guide 40 has a flat surface 204 and is partially formed by an oblong hole 218 provided through a central part 220 of the ring 20 which is extended by the flange 202. The housing is extended by two apertures 222 through an axial edge 224 of the outer ring 20.

In this embodiment, the cable 26 is divided, at the end facing the bearing 2, into four groups of wires 262 grouped in two sleeves 264. The wires 262 are connected to the thermocouples 500. At the opposite end, the cable 26 is divided into a plurality of connectors 260.

The cable guide 40 has a flat lower surface 280 adapted to be received by the flat surface 204. The guide 40 has two housings 400 at one end, each receiving one of the sleeves 264. At the outlet of these housings 400, the guide 40 has two lateral apertures 402, allowing a group of wires 262 to pass out along a curved path towards a channel 206 of the ring 20, into which the wires of this group of wires 262 are inserted. As may be seen in FIG. 21, the channel 206 therefore receives two groups of wires 262a and 262b, which spread out on either side of the guide 40.

The remaining two groups of wires 262c and 262d pass under an annular part 404 of the guide 40, providing guidance through the oblong hole 218. The groups of wires 262c and 262d are therefore guided through the central part 220 towards a second channel 207, which is separated from the channel 206 by the central part 220. The groups of wires 262c and 262d pass out of the guide 40 through apertures 406 towards the groove 207. The guide 40 is extended by a bearing face 408 by which an axial movement is imparted to the guide 40 for its insertion into the ring 20.

The housings 400 of the guide 40 are separated by a space 410 which forms a concave cylindrical surface 412. This space 410 houses a radial protuberance 226 of the outer ring 20, which separates the apertures 222, to form means of locking in rotation. Positioning is facilitated by the presence of a convex cylindrical part 226a on the protuberance 226, having a complementary shape to that of the concave cylindrical surface 412.

Assembly is carried out by coating the guide 40 and the housing 204, as well as the oblong hole 218, with adhesive. The guide 40 is inserted until the cylindrical surfaces 412 and 226a are brought into contact. After the excess adhesive has been removed, the sleeves 264 are passed into the housings 400, and the groups of wires 262 are passed into the corresponding apertures 402 and 406 and into the grooves 206 and 207. The channels 206 and 207 are then filled with resin applied to the wires 262 and the guide 40.

Overall, the different embodiments and variants of the invention ensure that the connection of the cables to the bearing is robust against external mechanical stresses. Positioning by means of a flat surface provides accurate positioning which is little affected by manufacturing tolerances, notably on the curved surfaces. Assembly is simple and quick. The structure is compatible with the requirements for the strength of components and meets the constraints of overall dimensions because of the compactness of the cable guide.

The structure of the cable guide according to the invention and its assembly reduce the number of components required, and therefore reduces the cost of the sensor bearing assembly, its assembly, its inspection before putting into use, and its maintenance.

In the embodiments illustrated and described in detail, the bend in the cable guide causes the cable to form an angle of between 80° and 100°, and preferably close to or equal to 90°. However, any other angle, if required for better adaptation to the available space around the sensor bearing when in use, would be feasible.

According to an embodiment which is not shown, the assembly E may provide more than one inner ring 22 and/or more than one outer ring 20 of a bearing 2.

What is claimed is:

1. A sensor bearing assembly comprising:
    a bearing having at least one inner ring and at least one outer ring;
    at least one sensor installed in the bearing;
    at least one cable connecting the sensor to an external device; and
    a cable guide fixed to the bearing, into which the cable is inserted; wherein
    the cable guide provides a flat part fixed to and resting on a flat housing of one of the rings of the bearing; and
    means for locking the cable guide in rotation relative to the ring of the bearing to which it is fixed, wherein the cable guide has an internal geometry having a first area with a first diameter and a second area with a second diameter, the second diameter being different from the first diameter, the first diameter being configured to engage an insulated cable and the second diameter being configured to engage only a conductor cable portion.

2. The sensor bearing assembly according to claim 1, wherein the cable guide has a bend at an angle of between eighty degrees (80°) and one hundred degrees (100°) between the part of the cable entering the cable guide and the part of the cable installed in the bearing.

3. The sensor bearing assembly according to claim 1, wherein the cable guide is divided into two parts assembled together and located on either side of the cable.

4. The sensor bearing assembly according to claim 3, wherein the two parts forming the cable guide provide mutual positioning elements having interacting shapes.

5. The sensor bearing assembly according to claim 3, wherein one of the two parts of the cable guide has a flat face adapted to be fixed to the flat housing of the ring of the bearing, and wherein the cable guide has funnel shapes adapted to center the cable in a location provided for receiving this cable.

6. The sensor bearing assembly according to claim 1, wherein the cable guide is made of a metallic material.

7. A sensor bearing assembly comprising:
    a bearing having at least one inner ring and at least one outer ring;
    at least one sensor installed in the bearing;
    at least one cable connecting the sensor to an external device; and
    a cable guide fixed to the bearing, into which the cable is inserted; wherein
    the cable guide provides a flat part fixed to and resting on a flat housing of one of the rings of the bearing; and means for locking the cable guide in rotation relative to the ring of the bearing to which it is fixed, wherein the cable is fixed by adhesion in the cable guide, the cable guide is fixed by adhesion to the ring of the bearing, and a resin is injected on to the cable guide and the parts of the ring of the bearing surrounding it.

8. A sensor bearing assembly comprising:

a bearing having at least one inner ring and at least one outer ring;

at least one sensor installed in the bearing;

at least one cable connecting the sensor to an external device; and a cable guide fixed to the bearing, into which the cable is inserted; wherein the cable guide provides a flat part fixed to and resting on a flat housing of one of the rings of the bearing; and means for locking the cable guide in rotation relative to the ring of the bearing to which it is fixed, a heat-shrinkable sleeve covering part of the cable entering the cable guide and part of the cable guide, and the part of the cable guide covered by the heat-shrinkable sleeve provides radial shapes for the attachment of the heat-shrinkable sleeve.

9. A sensor bearing assembly comprising:

a bearing having at least one inner ring and at least one outer ring;

at least one sensor installed in the bearing;

at least one cable connecting the sensor to an external device; and a cable guide fixed to the bearing, into which the cable is inserted; wherein the cable guide provides a flat part fixed to and resting on a flat housing of one of the rings of the bearing; and means for locking the cable guide in rotation relative to the ring of the bearing to which it is fixed, wherein the flat housing is provided on the outer ring of the bearing and communicates with at least one peripheral channel in which the cable is inserted and guided towards the sensor.

* * * * *